(12) United States Patent
Lim (10) Patent No.: US 10,857,948 B2
(45) Date of Patent: Dec. 8, 2020

(54) CONVERTIBLE VEHICLE STORAGE CONTAINER

(71) Applicant: Stephen Sophorn Lim, Desert Hot Springs, CA (US)

(72) Inventor: Stephen Sophorn Lim, Desert Hot Springs, CA (US)

( * ) Notice: Subject to any disclaimer, the term of this patent is extended or adjusted under 35 U.S.C. 154(b) by 0 days.

(21) Appl. No.: 16/297,709

(22) Filed: Mar. 11, 2019

(65) Prior Publication Data

US 2020/0290520 A1 Sep. 17, 2020

(51) Int. Cl.
| | |
|---|---|
| *B60R 9/055* | (2006.01) |
| *B60R 9/045* | (2006.01) |
| *B60R 9/058* | (2006.01) |
| *B60R 11/00* | (2006.01) |
| *B60R 9/048* | (2006.01) |

(52) U.S. Cl.
CPC .............. *B60R 9/045* (2013.01); *B60R 9/055* (2013.01); *B60R 9/058* (2013.01); *B60R 9/048* (2013.01); *B60R 2011/004* (2013.01)

(58) Field of Classification Search
CPC ................................ B60R 9/055; B60R 9/058; B60R 9/04; Y10T 16/53842; Y10T 16/53848
See application file for complete search history.

(56) References Cited

U.S. PATENT DOCUMENTS

| | | | | | |
|---|---|---|---|---|---|
| 3,770,186 | A | * | 11/1973 | Kupersmit | B65D 19/20 206/600 |
| 4,030,600 | A | * | 6/1977 | Heaps | B65D 19/20 206/597 |
| 4,221,302 | A | * | 9/1980 | Kupersmit | B65D 19/12 220/1.5 |
| 4,577,772 | A | * | 3/1986 | Bigliardi | B65D 88/121 220/1.5 |
| 4,620,743 | A | * | 11/1986 | Eke | B60J 5/101 16/364 |
| 5,332,021 | A | * | 7/1994 | Todd | A47K 3/38 160/133 |
| 5,546,705 | A | * | 8/1996 | Hirtsiefer | B60R 9/055 49/386 |
| 5,997,072 | A | * | 12/1999 | Parkinson | B60J 5/12 296/146.8 |
| 6,170,689 | B1 | * | 1/2001 | Flesher | B65D 19/06 206/508 |
| 6,505,878 | B1 | * | 1/2003 | Mascolo | B60J 7/04 296/100.04 |

(Continued)

*Primary Examiner* — Brian D Nash (57) ABSTRACT

A convertible vehicle storage container comprises of a front panel, rear panel, two side panels and a base panel, with the base panel observed in a horizontal plane establishes the structure foundation. The structure is derived with the hinged end of the panels to attach to the edge of the base panel on all four sides; there allows for the four side panels to merge into structure. Handle at the front and rear panel latches and lock into place at vertical edge of the four panels point of contact. A flexible sliding door rest at the bottom of the base panel suspends on two tracks parallel to each other, have the accessible motion along the bottom to rear of the container and along the top edges of the side panels, to enclose the structure when manually assisted. The vehicle storage container is developed to mount on top of any vehicle with a roof rack system, and with the ability to convert into a smaller flat structure when not in use.

2 Claims, 7 Drawing Sheets

(56) References Cited

U.S. PATENT DOCUMENTS

| | | | | |
|---|---|---|---|---|
| 7,699,372 B2 * | 4/2010 | Adams | | B60R 9/055 224/324 |
| 2001/0029880 A1 * | 10/2001 | McCarthy | | B60R 9/045 114/353 |
| 2003/0173387 A1 * | 9/2003 | Mitchell | | B60R 9/06 224/499 |
| 2004/0139923 A1 * | 7/2004 | Axelrod | | A01K 1/0245 119/498 |
| 2006/0037713 A1 * | 2/2006 | Ichimaru | | B60R 11/00 160/37 |
| 2006/0043130 A1 * | 3/2006 | Dabrowski | | B60R 9/05 224/328 |
| 2006/0175368 A1 * | 8/2006 | Fallis, III | | B60R 9/042 224/310 |
| 2007/0114256 A1 * | 5/2007 | Rodden | | B60R 9/055 224/328 |
| 2007/0164066 A1 * | 7/2007 | Jones | | B60R 9/055 224/328 |
| 2007/0295570 A1 * | 12/2007 | Campbell | | A45C 5/14 190/15 R |
| 2008/0017679 A1 * | 1/2008 | Leblanc | | B60R 9/055 224/328 |
| 2008/0169322 A1 * | 7/2008 | McMillan | | B60R 9/055 224/328 |
| 2008/0224492 A1 * | 9/2008 | Adams | | B60R 9/055 296/37.1 |
| 2008/0245834 A1 * | 10/2008 | Abramczyk | | B60R 9/04 224/539 |
| 2009/0001770 A1 * | 1/2009 | Baccelli | | B60J 7/047 296/210 |
| 2009/0127305 A1 * | 5/2009 | Ropp | | B60P 1/003 224/404 |
| 2009/0212593 A1 * | 8/2009 | Larson | | B60P 3/36 296/158 |
| 2012/0055967 A1 * | 3/2012 | McMillan | | B60R 3/007 224/315 |
| 2014/0132022 A1 * | 5/2014 | Espig | | B60R 9/055 296/37.7 |
| 2018/0297536 A1 * | 10/2018 | Kondo | | E05F 15/611 |
| 2019/0039535 A1 * | 2/2019 | Boinais | | B60N 2/793 |

* cited by examiner

CONVERTIBLE VEHICLE STORAGE CONTAINER

CROSS-REFERENCE TO RELATED APPLICATION

Not Applicable

BACKGROUND OF THE INVENTION

Field of Invention

Figure 2:
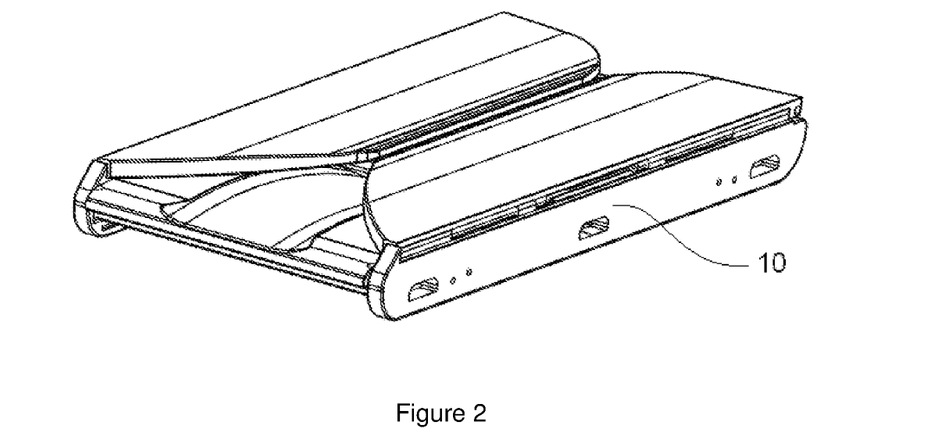
FIG. 2 details a three dimensional view of a folded Convertible Vehicle Cargo Container.

The purpose of this invention is to develop a vehicle storage container that converts into a smaller flat structure as illustrated in FIG. 2. The Convertible Vehicle Storage Container or CVSC delivers additional compartment space for vehicles requiring additional storage and usually mounts on top of any vehicle with a roof rack system. The CVSC introduces four hinged panels that attach to a base panel, which can be converted from an integral structure into a smaller flat structure when not in use, a convenient approach for compact space usage. Vise versa from a smaller flat structure to a utilized storage container when in use.

Description of Other Inventions

An existing vehicle storage product is that of U.S. Pat. No. 7,699,372 B2 of Adams et al. Adams storage product is fastened on top of the recess roof of the vehicle, and converts from the roof of the vehicle for storage implementation. This feature limits storage versatility from one vehicle to the other vehicle. Another existing product is of US 2006/0175368 A1 of Fallis, III et al. Fallis storage product slides to the rear of the vehicle for loading. The Fallis carrier product development with the permanent attachment to the roof rack limits the versatility of the storage carrier usage with other vehicles. Both of Adams and Fallis are unique and creative with their designs and developments, but an inconvenient for users with many vehicles, for different occasion usage.

Objects and Advantages

The Convertible Vehicle Storage Container is designed and developed to mount atop any vehicle with the assistance of a vehicle roof rack system. The CVSC derives many features to accommodate convenience for the user.

The CVSC can be converted into a flat structure with folding of the hinged panels that is attached to the base panel on all four sides. The folding feature allows the storage container to be stored in compact spaces. In the functional folding order from an integral structure into a smaller flat structure, the smaller of the panels, front and rear convert first, followed by the larger panels, left and right side. Converting back from a smaller flat structure into an operational integral structure, the functional folding order allows for the side panels to unfold first, then the front and rear panels follow, where the edges meet to lock into position.

Another feature for the CVSC is the flexible sliding door structure that is tucked underneath the base panel when folded at rest, when in use, slides into an operational door when the CVSC converts into a vehicle storage compartment structure. The motion of the flexible door trails from the bottom of the base panel along the edges of the side panels to the top openings of the CVSC in FIG. 16 and other illustrations.

SUMMARY OF THE INVENTION

The Convertible Vehicle Storage Container is developed to derive a dynamic appearance and deliver unique features like the conversion from an integral structure into a smaller flat panel structures. The sliding door is another unique feature that rest beneath the base panel when in folded mode, slides along the top edges of the left and right side panels when unfold into a utilized structure. The CVSC can be observed in details with two criteria, usage and non-usage mode. The usage mode is detailed from the folded flat structure to an integral structure. As the non-usage mode is detailed from the integral structure folding into a smaller flat structure.

From the usage mode, order of operation for the panels are as follows with the two side panels (hinged from one end) motion upward from each side to at about perpendicular position from the base panel, which allows for the front and rear panel (both hinged from one end) to motion upward at an acute angle position from the base panel. With each corner edges of the panels merge to grip with latch handles locking into structure resulting in a rigid integral structure system. Sliding the flexible door from the base panel to the top open space of the CVSC completes the storage compartment structure when in usage mode.

For the non-usage mode, order of operation of the panels are as follow: Unlatch the handle free the panels from each edges, allowing for the front and rear panels to fold inwards, followed by the side panels to fold inward towards the inside of the base panel. Sliding the flexible door from the top of the CVSC back to the base panel puts the CVSC in non-usage mode.

To complete the Convertible Vehicle Storage Container structure, seals of rubber and/or silicon and/or applicable type seals at about and around the merged edges of the panels are considered for weatherproofing within the storage compartment and as well as strengthening the rigidity of the structure.

BRIEF DESCRIPTION OF THE DRAWINGS

In the drawings, illustrations in some views are composed of the same reference numbers with different assembly views for the Convertible Vehicle Storage Container.

DRAWINGS—REFERENCE NUMERALS

| 10 | Base Panel | 11 | Rack Mount Hole |
|---|---|---|---|
| 12 | Ball Bearing Track | 14 | Front Fold Indentation |
| 16 | Rear Fold Indentation | 18 | Hinge Socket and Pin |
| 19 | Vertical Mount Hole | 20 | Front Fold Panel |
| 22 | Front Latch Handle | 24 | Front Latch Grip |
| 26 | Flexible Door Seal Channel | 30 | Right Swing Panel |
| 32 | Rear Latch Socket | 34 | Front Latch Socket |
| 36 | Left Swing Panel | 40 | Rear Fold Panel |
| 42 | Rear Panel Latch Handle | 44 | Rod and Latch Grip |
| 46 | Roof Rack Mount | 47 | Rack Mount Screw |
| 48 | Vertical Mount Screw | 50 | Flexible Slide Door |
| 52 | Slide Door Strip | 54 | Seal Groove |
| 56 | Roller Ball | 58 | Roller Washer |
| 60 | Roller Ball Screw | | |

Figure 1:
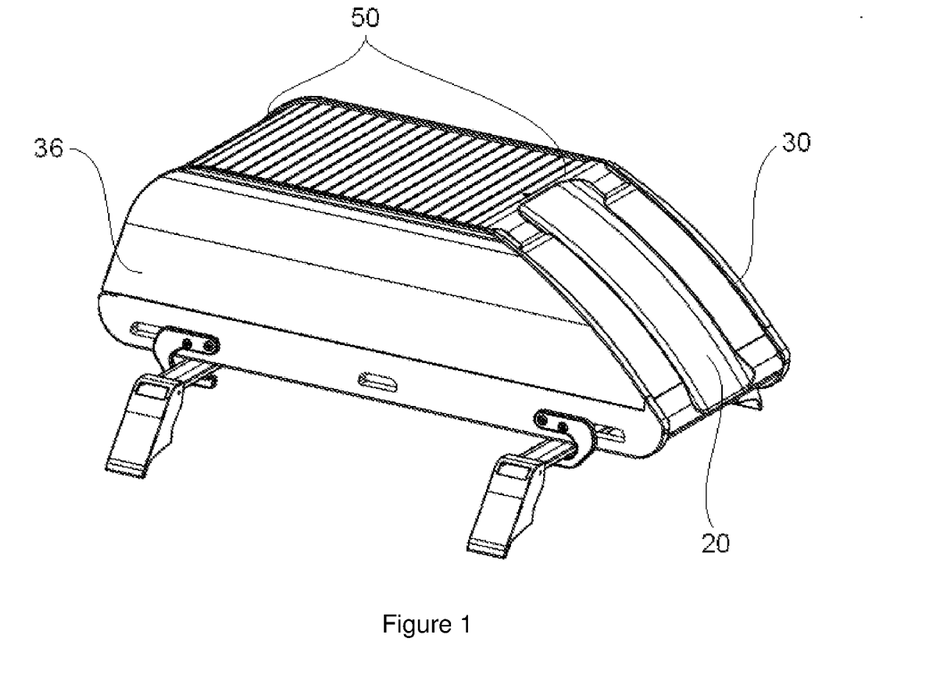
FIG. 1 illustrates a trajectory view of the CVSC structure mounted on a vehicle roof rack system.

DETAILED DESCRIPTION OF THE INVENTION—FIGS. 1 and 2—EMBODIMENT

A preferred embodiment of like structure of the Convertible Vehicle Storage Container invention in FIG. 1 (three-dimensional view) derives a foldable storage structure product consists of the Base Panel [10], Right Side Panel [30], Left Side Panel [36], Front Panel [20], and Flexible Slide Door [50] that hinges at the Hinge Socket and Pin [18] with rubber and/or silicon seals applied to applicable edges of the panels.

A preferred embodiment of like structure In FIG. 2 assembles the CVSC into a smaller folded structure consists of the Front Panel [20] hinges at Hinge Socket and Pin [18] to the Base Panel [10] folds inward towards the inside of the Base Panel [10]; counter to Front Panel [20], hinges at Hinge Socket and Pin [18] is the Rear Fold Panel [40], which folds inward towards the inside of the Base Panel [10]. Facing normal towards the Front Panel [10] along each sides, hinge at the Hinge Socket and Pin [18] are the Right Side Panel [30] and Left Side Panel [36], which folds inward towards the inside of the Base Panel [10].

Figure 3:
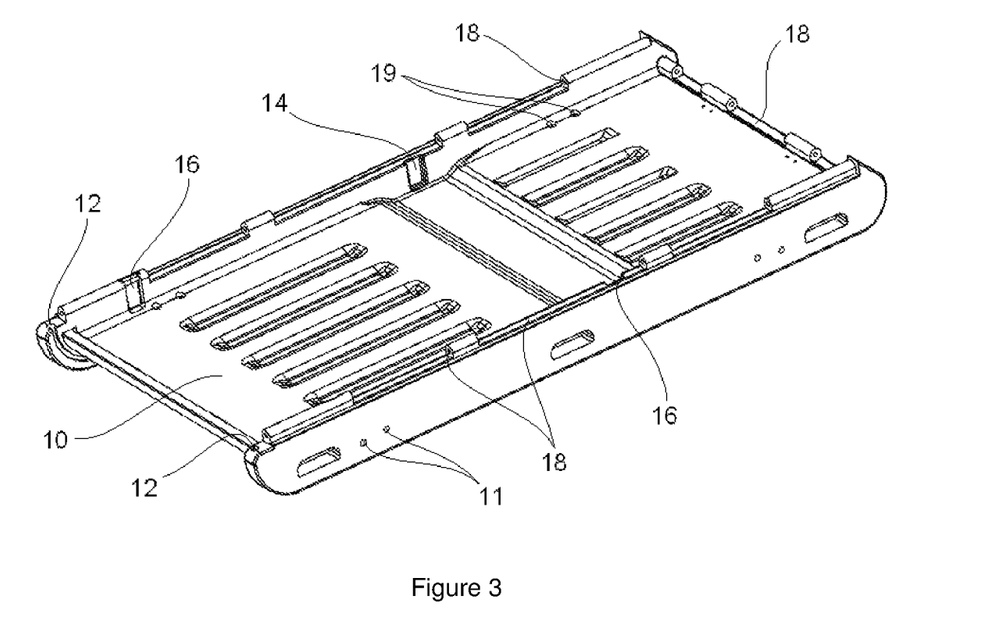
FIG. 3 illustrates the trajectory of the Base Panel with number assignment for component attachments and fitting of the CVSC.

DETAILED DESCRIPTION—FIGS. 3—EMBODIMENT

A preferred embodiment of the Base Panel [10] in FIG. 3 comprises of two Ball Bearing Track [12] that situates along the two longer lengths of the panel, which tracks face each other is placed at about the edges along the bottom inside portion of the panel, curves upward at the rear. Along the two longer length on top of the panel edges situate the Hinge Socket and Pin [18], with the Front Fold Indentation [14] and Rear Fold Indentation [16]; at the outside of each side portion are the Rack Mount Hole [11] that penetrates through to the other end for mounting the CVSC to a vehicle rack system. Within the inside of the panel of the longer lengths contain the Vertical Mount Hole [19], screw, pin and hole for secure reinforcement. The shorter two lengths situate the Hinge Socket and Pin [18] at the front and rear edges of the panel.

Figure 4:
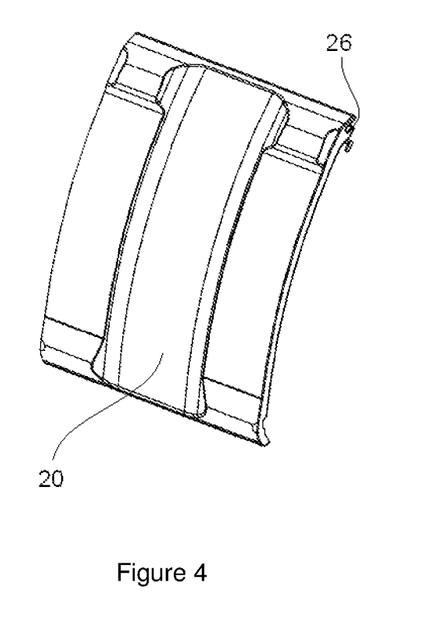
FIGS. 4 and 4A details the front side and rear side in a three dimensional view of the Front Panel of the Convertible Vehicle Storage Container.
Figure 4A:
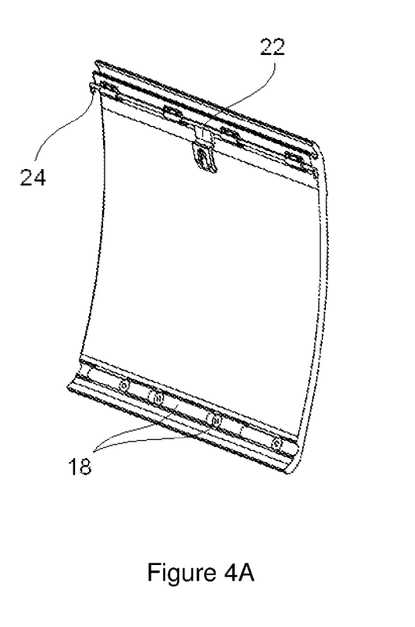

DETAILED DESCRIPTION—FIGS. 4 and 4A—EMBODIMENT

A preferred embodiment in FIG. 4 details the front appearance of the Front Panel [20] with a Flexible Door Seal Channel [26]; in FIG. 4A is the back appearance of the Front Panel [20], where the Hinge Socket and Pin [18] situates a the bottom edge, counter to the top positions the Front Latch Handle [22] and Front Latch Grip [24] assembled.

Figure 5:
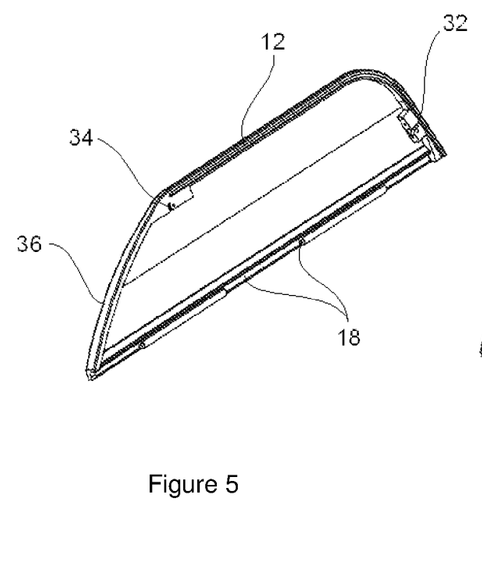
FIGS. 5 and 5A illustrates the trajectory view of the inside of the Left Swing Panel as FIG. 5A illustrates the outside of the Right Swing Panel of the CVSC.
Figure 5A:
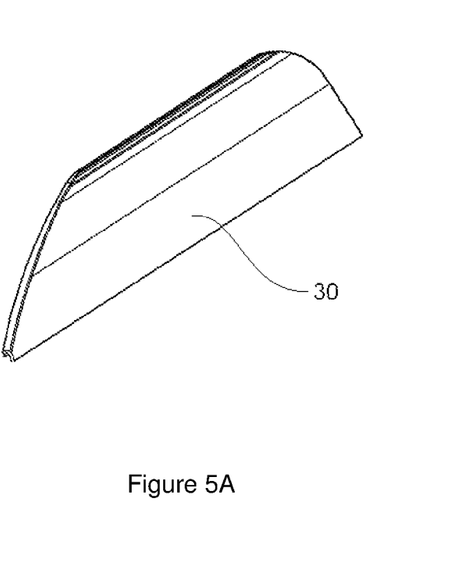

DETAILED DESCRIPTION—FIG. 5—5A—EMBODIMENT

A preferred embodiment in FIGS. 5 and 5A details the Swing Left Panel [36] and Swing Right Panel [30]. At the back side of both panels situate the Ball Bearing Track [12] that aligns along the rear edges to top edges of the panel with Hinge Socket and Pin [18] situated along the bottom edges; next to the track at the rear of the panel situates the Rear Latch Socket [32], where the track ends to the top front of the panel situates the Front Latch Socket [34].

Figure 6:
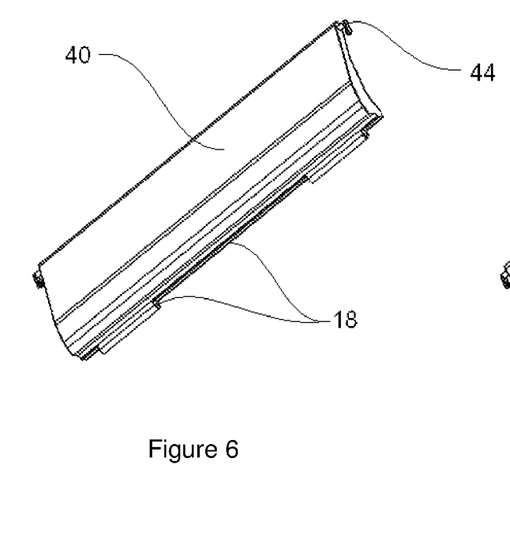
FIGS. 6 and 6A is a trajectory image of the outside and inside appearance of the Rear Panel of the Convertible Vehicle Storage Container.
Figure 6A:
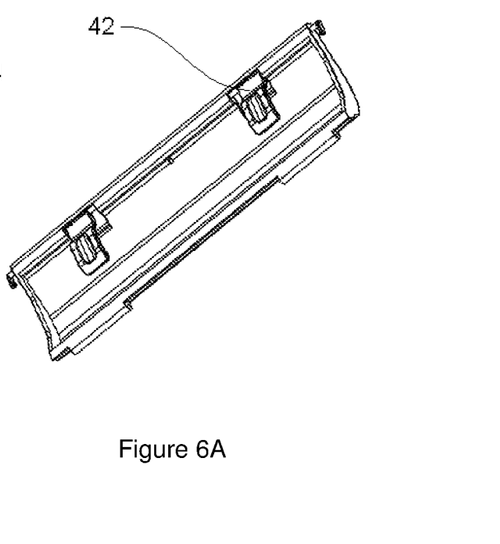

DETAILED DESCRIPTION—FIGS. 6-6A—EMBODIMENT

A preferred embodiment of like structure in FIG. 6 shows the front appearance of the Rear Fold Panel [40], where the bottom larger edge channels the Hinge Socket and Pin [18] with the opposite end contains the Rod And Latch Grip [44]. Detailing the larger edge in FIG. 6A assembles two Rear Panel Latch Handles [42] placed near edge and corner of the panel.

Figure 7:
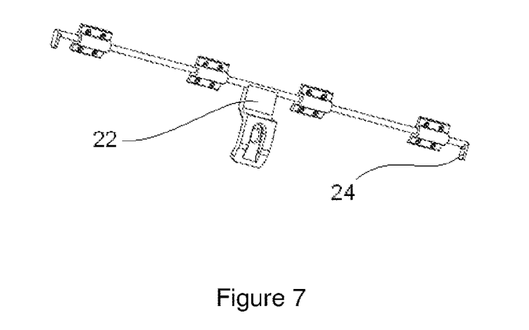
FIG. 7 details the trajectory view of the Front Latch Handle for the CVSC.

DETAILED DESCRIPTION—FIG. 7—EMBODIMENT

An embodiment assembly in FIG. 7 (three dimensional view) shows the Front Latch Handle [22] with the Front Latch Grip [24] for mounting into the Front Panel [20] as the Latch Handle [22] suspends and locking into position application when converting of the Convertible Vehicle Storage Container takes motion.

Figure 8:
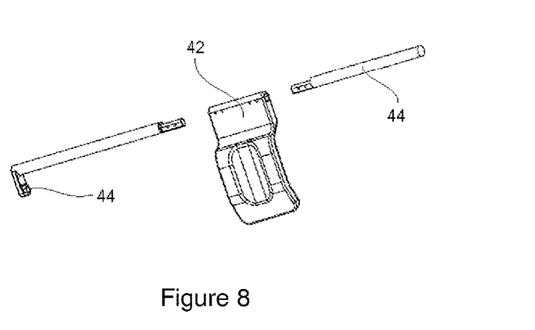
FIG. 8 illustrates an exploded view of the Rear Panel Latch Handle for the Convertible Vehicle Storage Container.

DETAILED DESCRIPTION—FIG. 8—EMBODIMENT

An embodiment in FIG. 8 illustrates an exploded view of the Rear Panel Latch Handles [42] with the Rod And Latch Grip [44] placed at each end, is developed for installation into the corner edge of the Rear Fold Panel [40].

Figure 9:
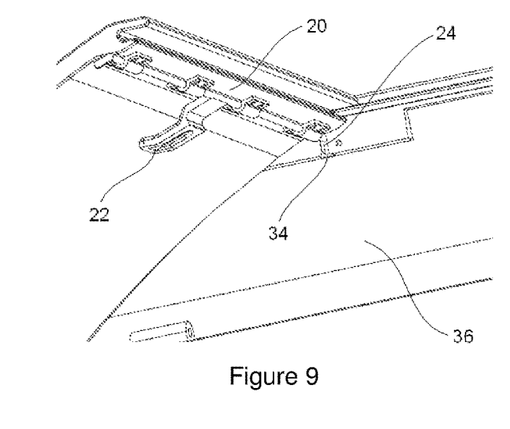
FIG. 9 details an assembly of the Front Panel edge merged with the Left Swing Panel edge, latched into structure of the CVSC.

DETAILED DESCRIPTION—FIG. 9—EMBODIMENT

An embodiment assembled in FIG. 9 details a converted structure, derives the Left Swing Panel [36] merged with the Front Panel [20] is latched at the Front Latch Socket [34] and Front Latch Grip [24] locks into structure.

Figure 10:
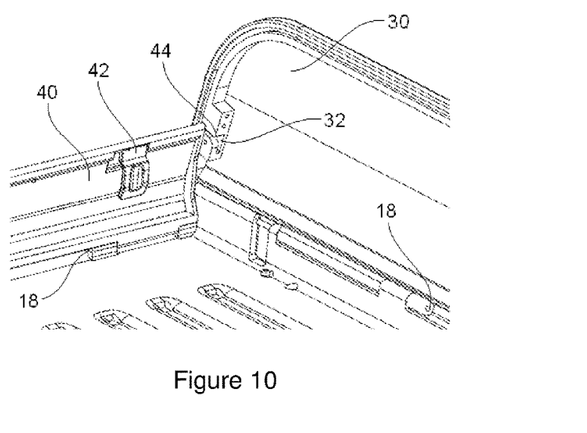
FIG. 10 details an assembly of the Rear Panel edge merged with the Right Swing Panel, latched into structure of the Convertible Vehicle Storage Container.

DETAILED DESCRIPTION—FIG. 10—EMBODIMENT

An embodiment assembled in FIG. 10 details a structure, derives the Right Swing Panel [30] merged with the Rear Fold Panel [40] is latched at the Rear Latch Socket [32] and Rod and Latch Grip [44] locks into structure.

Figure 11:
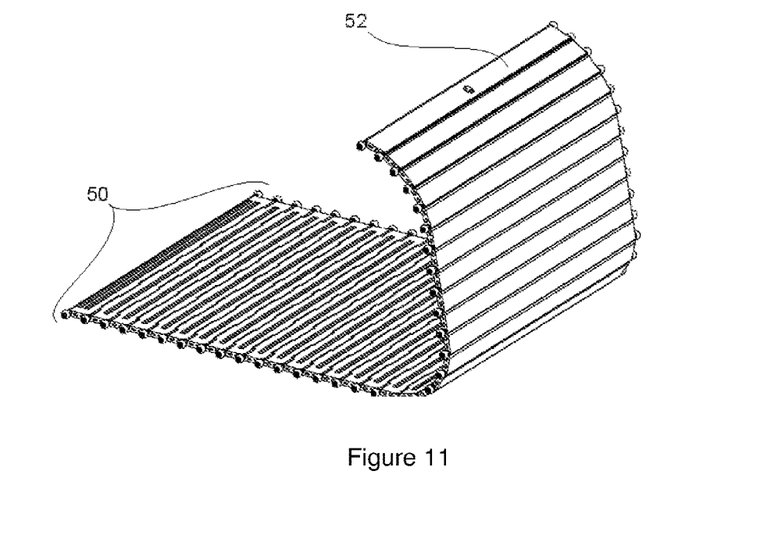
FIG. 11 is an assembled Strip Bars of the Flexible Slide Door of the CVSC.
Figure 12:
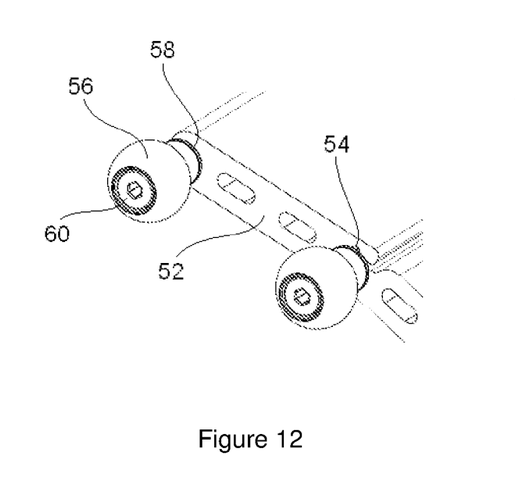
FIG. 12 details the Strip Bar assembled with the Washer, Ball Bearing and Screws, for the Flexible Slide Door of the Convertible Vehicle Storage Container.

DETAILED DESCRIPTION—FIG. 11—12—EMBODIMENT

An embodiment assembled in FIG. 11 derives the Flexible Slide Door [50] and Slide Door Strip [52] hinged into like structure with the lead Slide Door Strip [52] containing a hole for locking application; at each ends of the Slide Door Strip [52] attaches the Roller Washer [58], Roller Bearing Balls [56] and Roller Ball Screws [60] with detail illustration in FIG. 12. A slight indentation at the Seal Groove Notch [54] is channeled within the hinged area of the Slide Door Strip [52] for weatherproofing.

Figure 13:
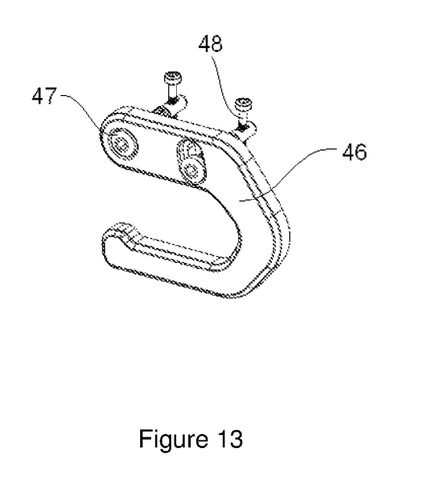
FIG. 13 details an optional component of the Roof Rack Mount assembly with the Rack Mount Screw and Vertical Mount Screw securing the mount for the CVSC, as other roof rack mounts can be custom to fit various roof rack system.

DETAILED DESCRIPTION—FIG. 13—EMBODIMENT

An assembled embodiment in FIG. 13 (three dimensional view) derives one of the many optional for development of a Roof Rack Mount [46] with Rack Mount Screw [47] motioned into position at the Vertical Mount Screw [48] motioned perpendicular for secure reinforcement.

Figure 14:
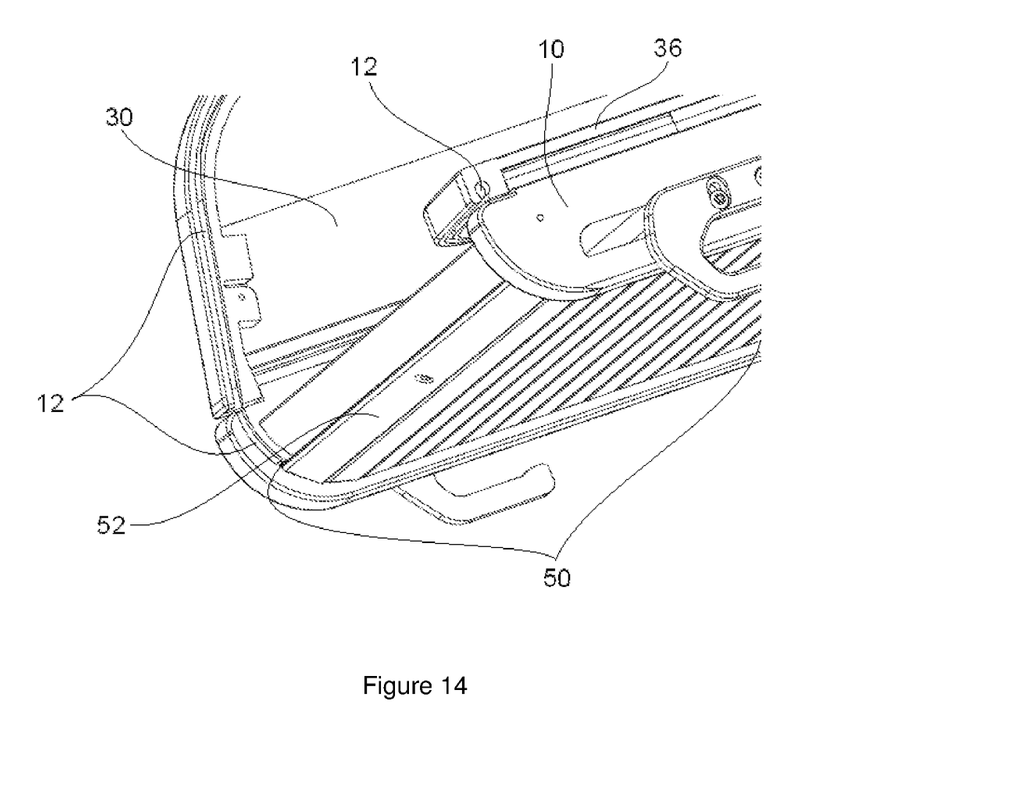
FIG. 14 illustrates the rear portion of the Convertible Vehicle Storage Container with folding of one of the side panels to detail the Ball Bearing Tracks for the Flexible Slide Door.

DETAILED DESCRIPTION—FIG. 14—EMBODIMENT

An embodiment assembled in FIG. 14 details the rear and bottom portion of the Convertible Vehicle Storage Container with illustration of the Base Panel [10] attached to an unexposed illustration of the Rear Fold Panel [40] and a folded Left Swing Panel [36] exposing the Ball Bearing Track [12] for the Flexible Slide Door [50], a series of the Slide Door Strips [52] attached with long pins, placed beneath the Base Panel [10] side edges. Attached to the other end of the Base Panel is the other unfolded Right Swing Panel [30], where the Ball Bearing Track [12] continues to route along the edges of the Right Swing Panel [30].

Figure 15:
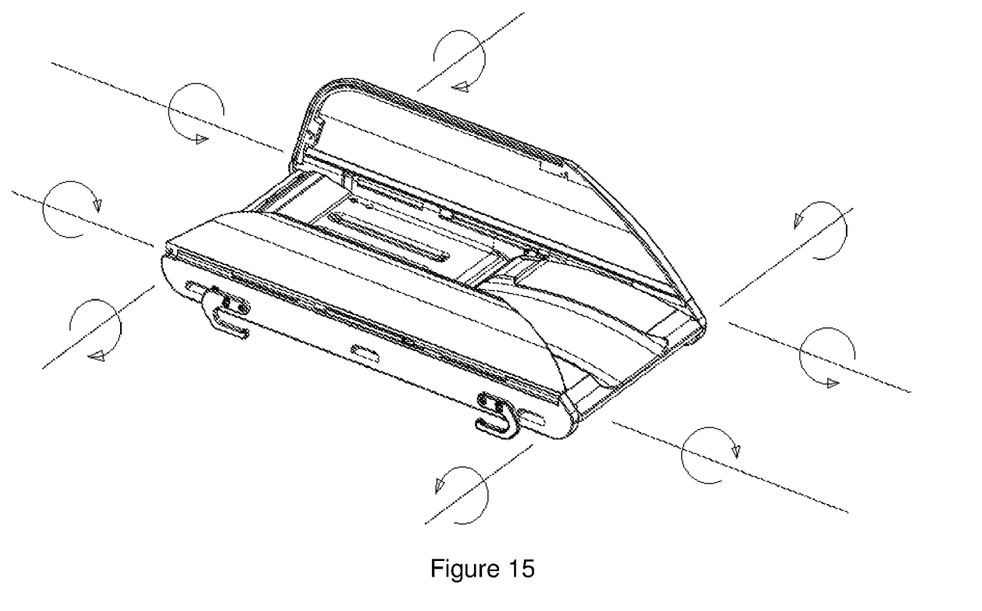
FIG. 15 details the trajectory view of some partial folds feature and folding directions of the CVSC.

DETAILED DESCRIPTION—FIG. 15—EMBODIMENT

An embodiment assembled in FIG. 15 illustrates a partial fold of the CVSC with folding directions, contains the Front Panel [20] and Rear Fold Panel [40] that is fold inward towards the Base Panel [10] allowing for the Left Swing Panel [36] to fold inward towards the Base Panel [10] and the Right Swing Panel [30] to remain unfold for illustration. Along the edges of the Base Panel [10] assembles the Roof Rack Mount [46] screwed into the bottom edges.

Figure 16:
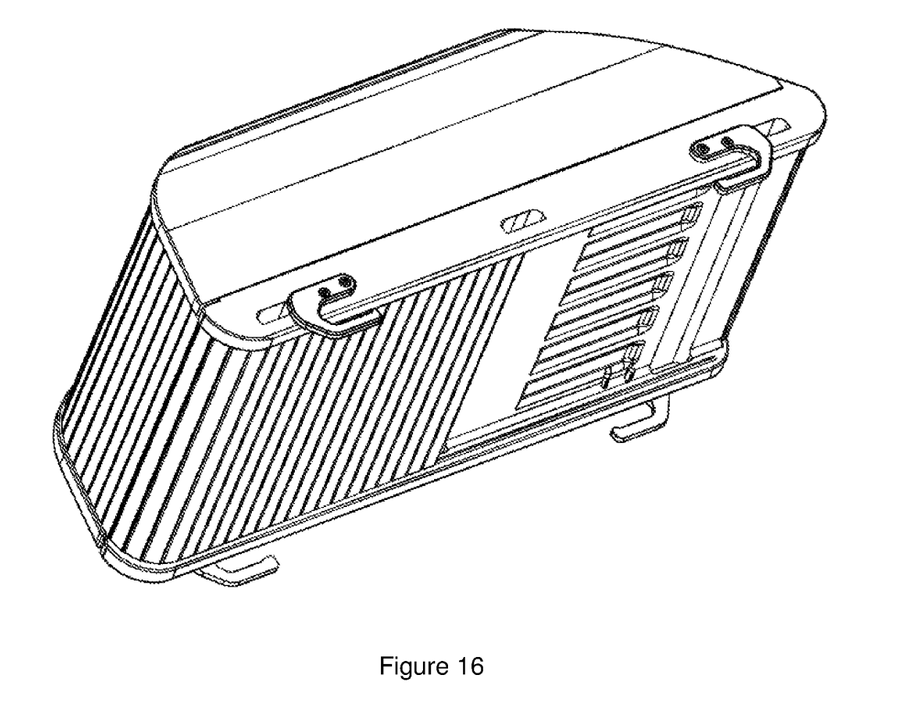
FIG. 16 illustrates a three dimensional view of the bottom of the Convertible Vehicle Storage Container fully assembled.

DETAILED DESCRIPTION—FIG. 16—EMBODIMENT

An embodiment assembly of the CVSC in FIG. 16 illustrates the rear bottom of Base Panel [10] where the Flexible Slide Door [50] is partially opened or closed, viewing perspectives; travels along the Rear Fold Panel [40], not exposed in this illustration.

Figure 17:
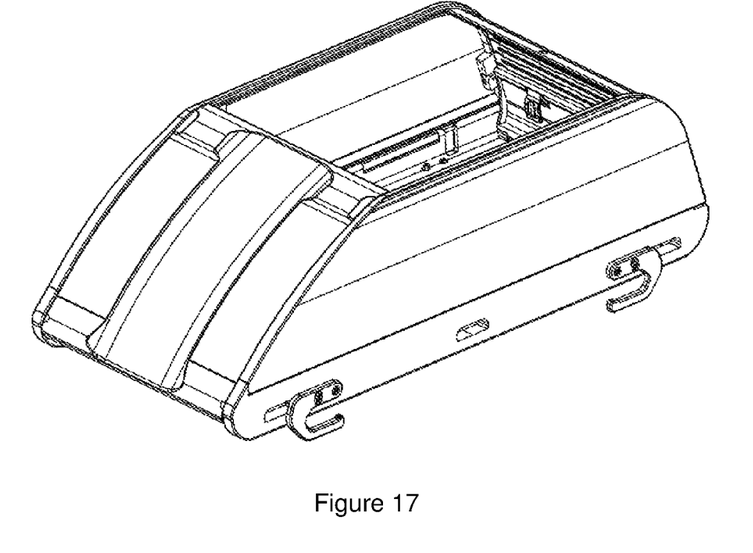
FIG. 17 details the trajectory view of the inside of the CVSC when the Flexible Slide Door is partially opened.

DETAILED DESCRIPTION—FIG. 17—EMBODIMENT

An embodiment in FIG. 17 illustrates the complete assembly of the top front view of the CVSC with the Flexible Slide Door [50] partially opened or closed exposes the inside storage compartment.

Figure 18:
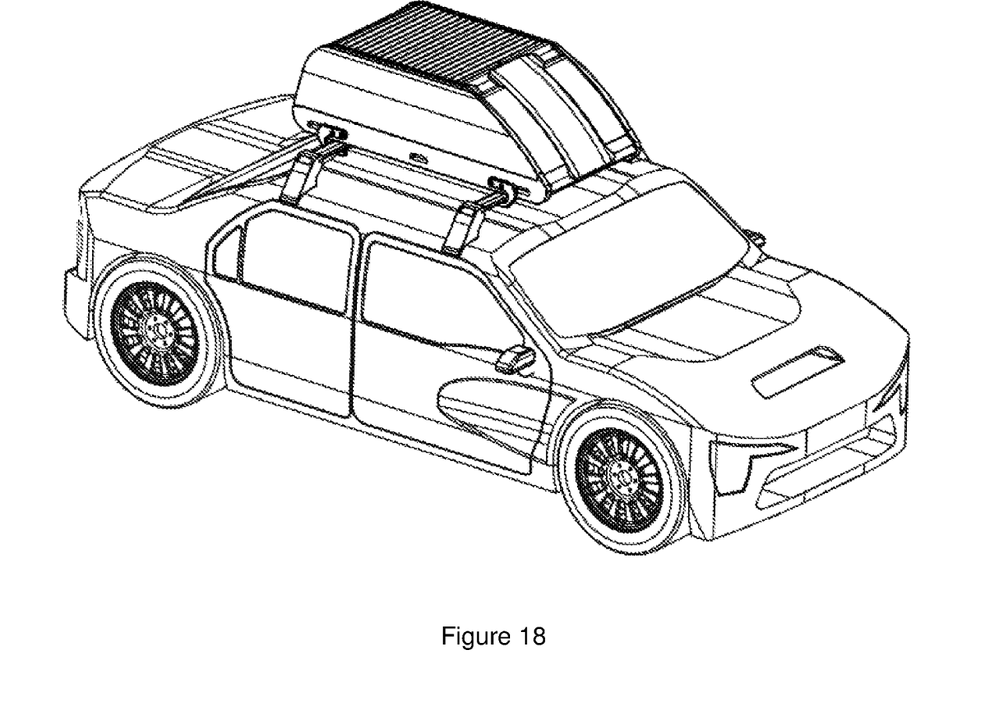
FIG. 18 illustrates the application for the Convertible Vehicle Storage Container mounted on top of a vehicle.

DETAILED DESCRIPTION—FIG. 18—EMBODIMENT

An assembled embodiment in FIG. 18 illustrates the Convertible Vehicle Storage Container in implementation mounts atop a vehicle roof rack system.

Operations—FIGS. 2, 9, 10, 14, 15, 16 and 17

In the order of folding and unfolding operation, FIG. 2 illustrates the Front Panel [20] and Rear Fold Panel [40] screwed fixed at the Hinge Socket and Pin [18] pivot motion inward towards the inside of the Base Panel [10], next accessible folding motion is either the Left Swing Panel [30] or Right Swing Panel [36], there motion towards the inside of the Base Panel [10], a smaller flat structure.

In the order of functionality in FIG. 9 illustration, the Front Panel [20] first motion away from the inside of the Base Panel [10] motion to an acute angle position merges with the Left Swing Panel [36]. The Front Latch Handle [22] situated at about the top, counter to the Hinge Socket and Pin [18] of the Front Panel [10] swings outward to allow the Front Latch Grip [24] to motion entry into the opening of the Front Latch Socket [34] of the Left Swing Panel [36], there grips into structure.

In the order of functionality in FIG. 10 illustration, the Rear Fold Panel [40] first motion away from the inside of the Base Panel [10] at an acute angle position to merge with the Right Swing Panel [30]. The Rear Panel Latch Handle [42] situated at about the top, counter to the Hinge Socket and Pin [18] of the Rear Fold Panel [40] swings outward away from the Rear Fold Panel [40] to allow the Rod and Latch Grip [44] to motion entry into the opening of the Rear Latch Socket [32] of the Rear Fold Panel [40], there grips into structure.

In the order of functionality in FIGS. 14,15,16, and 17, both of the Right Swing Panel [30] and Left Swing Panel [36] attached to the Base Panel [10] with Hinge Socket and Pin [18] open first, to allow for the Front Panel [20] and Rear Fold Panel [40] to motion into structure. Once fully opened with latch handle secured, the Ball Bear Tracks [12] aligns from the bottom of the Base Panel [10] with the Right Swing Panel [30] and Left Swing Panel [36] for the Flexible Slide Door [50] to travel along the tracks.

CONCLUSIONS

This invention objective is to develop the Convertible Vehicle Storage Container to mount on top of a vehicle with a roof rack system; then converts into a smaller flat structure when not in use. The versatile equipment contains unique features that distinguish its traits, as mentioned are the foldable panels and the flexible sliding door.

To enhance structural integrity, rubber and/or silicon and/or applicable type seals are situated along and/or at about the folded and connecting edges for tight fit and weatherproofing essentials within the storage compartment. High strength material lining for the track may be essential to prolong the longevity of the tracks along with natural lubricant, as rubbing from the ball bearings of the flexible sliding door may cause ware and tare. Other materials and/or engineer plastic may be considered for future development for both panels and ball bearings.

There are many methods of developing the sliding doors; the selection of the ball bearing and track shape was selected to enhance the structural rigidity of the side panels to stay intact when the door is fully closed; along with the rubber/silicon seals at about the area may secure and reduce vibrations. As the latches at the front and rear panels are already assisting in supporting the structural rigidity.

For future development, panels and component improvements may be required to pursue the best performance for the CVSC product, as components may be alter and/or replaces and/or re-introduces; there, deriving a new design, shape, features, and associated essentials to the product.

Other further improvements may be in the operational structure, as additional latches may be essential to provide rigidity and support to the structure. There may be many methods of developing the latches to provide effective structure formation.

The invention claimed is:

1. A vehicle storage container is developed to mount on top of a vehicle with a roof rack system comprising of a base panel, a front panel, a rear panel, two side panels, and a flexible sliding door, is capable of converting into a smaller structure; and wherein the side panels first move to open from the center of the container towards the sides thereof, then the front and rear panels move outwardly from the base panel to meet the side panels and latch together into a structure by a handle.

2. A vehicle storage container is developed to mount on top of a vehicle with a roof rack system comprising of a base panel, a front panel, a rear panel, two side panels, and a flexible sliding door, is capable of converting into a smaller structure; and wherein said flexible sliding door, which rests underneath the base structure, moves along a rear of the container along the top ledges of the side panels to provide closure to the structure when the structure is manually operated.

* * * * *